July 21, 1925.
T. CUMMINGS
MILKING MACHINE
Filed Jan. 14, 1922
1,546,718
2 Sheets-Sheet 1
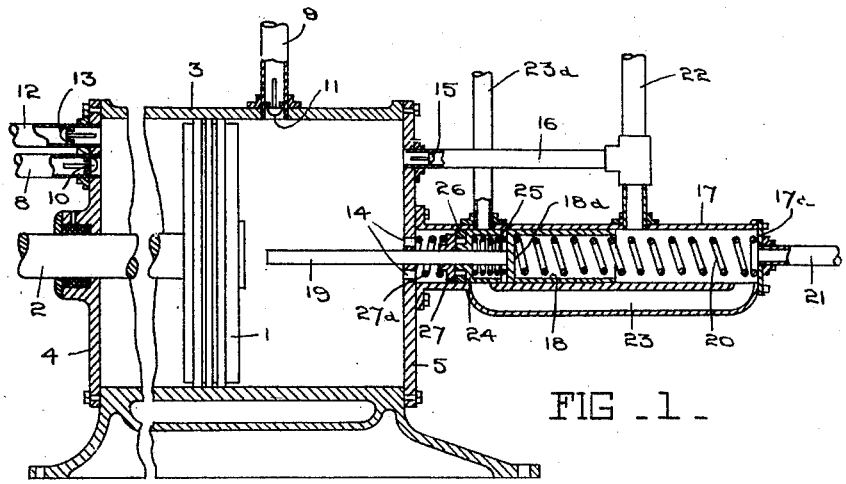
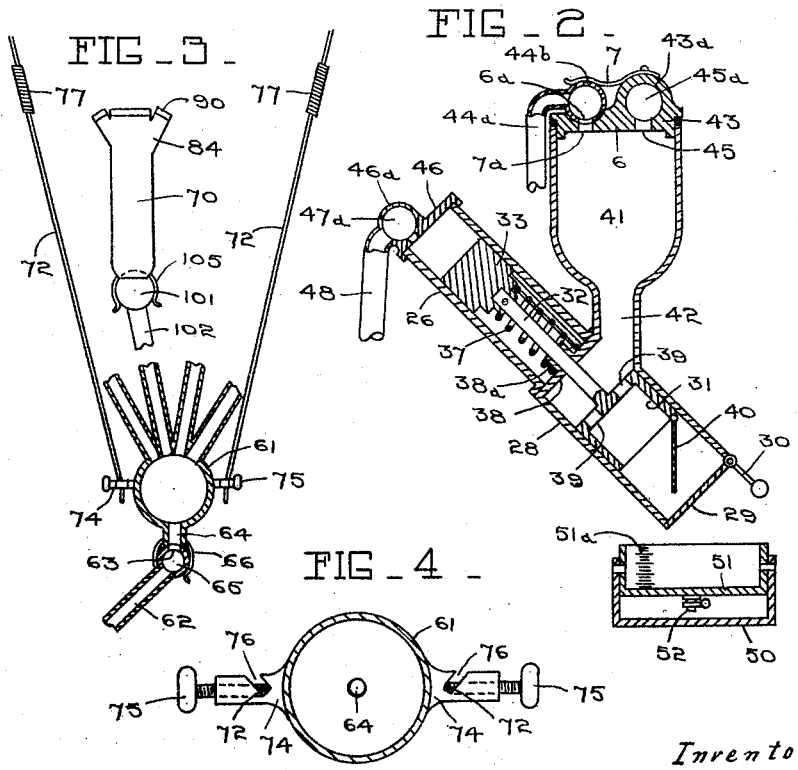
Inventor
T. Cummings
By Lawrence Langner
Atty

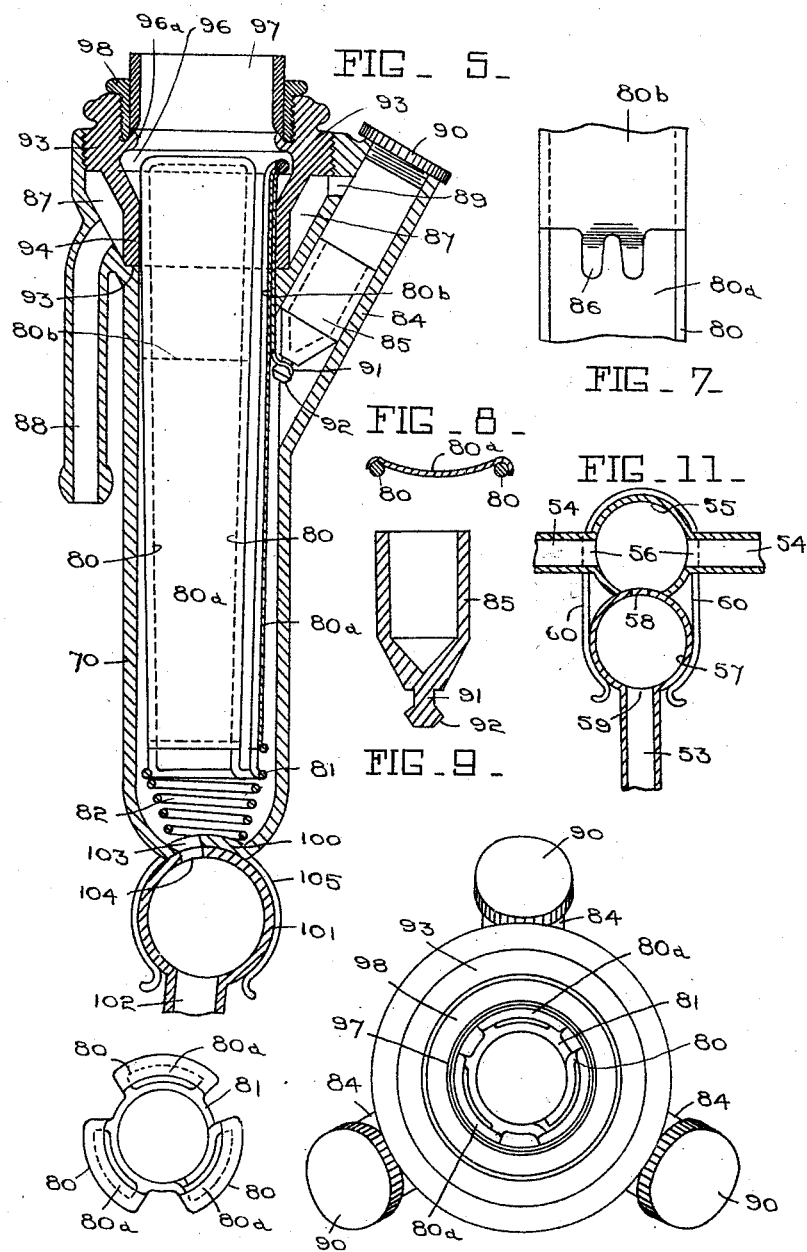

Patented July 21, 1925.

1,546,718

UNITED STATES PATENT OFFICE.

THOMAS CUMMINGS, OF AWAKINO, AUCKLAND, NEW ZEALAND.

MILKING MACHINE.

Application filed January 14, 1922. Serial No. 529,307.

*To all whom it may concern:*

Be it known that I, THOMAS CUMMINGS, a citizen of the Dominion of New Zealand, residing at Waitara Road, Awakino, in the Provincial District of Auckland, a subject of the King of Great Britain and Ireland, have invented certain new and useful Improvements in Milking Machines, of which the following is a specification.

This invention relates to milking machines and has for its object the provision of improved apparatus whereby milking and stripping may be performed in a more thorough manner than heretofore without employing the usual rubber inflations or linings in the teat cups, besides reducing the employment of rubber fittings and connections to a minimum.

Further objects are to provide improved means for measuring and enabling the milk from each cow to be tested, and also to provide improved means for freeing the milk from the vacuum of the plant.

In carrying out the invention the milk is induced to flow from the teats of the cow by means of pulsations produced by causing compressed air to act alternately with the effects of vacuum in teat cups, fitted internally with flexible jaws hinged at the bottom and normally tending to move outwards or against the casings, said jaws resting on spring supports in the lower ends of the casings, to which constant vacuum connections are also made.

Each jaw has flexibly connected thereto a plunger enclosed in a downwardly inclined cylinder on the outside of the casing, said cylinders being in communication through an air space with a nipple adapted to receive compressed air and vacuum alternately, whereby the plungers are alternately forced downwards and drawn upwards in their cylinders, such downward movements causing the jaws to be forced inwards and downwards in the teat cups in a manner such as to give mechanical action on the teats, corresponding closely to the action of the human hand in milking.

The means employed for creating the necessary air pressure and vacuum for operating the machine comprise an air compressor and exhauster operated by a prime mover in such a manner that at each stroke of its piston air is compressed in one end of its cylinder, while the air on the other side of said piston is exhausted.

The cylinder is connected from one end and from or near its other end with a vacuum tank, the connections employed being fitted with means whereby pressure is prevented from passing from the cylinder to said tank.

At one end the aforesaid cylinder is fitted with a smaller cylinder containing a sleeve valve the stem of which projects normally into the main cylinder under the influence of a compression spring located between the closed end of the sleeve valve and the outer end of the smaller cylinder.

The outer end of the latter cylinder is adapted to be put in communication with the pipe line of the system in which air pressure alternates with vacuum.

From the smaller cylinder at a point just beyond the sleeve valve when the latter occupies its normal position of rest a pipe leads to a compressed air reservoir the latter being also put in communication through a further pipe with the opposite end of the main cylinder, said last mentioned pipe being fitted with a nonreturn valve which allows air to enter the reservoir from the cylinder but not to return to the latter.

A pipe leading from the end of the main cylinder adjacent the smaller cylinder enters the pipe leading from the latter to the compressed air reservoir, while communication is provided between the outer end of the smaller cylinder and the interior thereof near the main cylinder.

A valve is provided at the end of the main cylinder adjacent the small cylinder for the purpose of permitting air to pass from the main cylinder by way of a pipe which enters the pipe leading from the smaller cylinder to the compressed air reservoir.

At the inner or closed end of the sleeve valve operating in the smaller cylinder is a smaller spring pressed valve adapted to close against a ring on the inside of said smaller cylinder. A valve of less diameter than the interior of the smaller cylinder and adapted to open under suction towards the main cylinder is normally held against the other side of the ring in the smaller cylinder by a spring. A connection is also made between the vacuum tank and the smaller cylinder.

The means for releasing the milk from the vacuum of the system comprise a chamber in communication with a constant vacuum pipe line, and with an inclined cylinder in which is adapted to be operated by the alternate actions of compressed air and vacuum a hollow piston fitted at its outer or lower end with a flap valve. The above mentioned chamber is also in communication through a connection with the interior of one or more sets of teat cups, while the outer or lower end of the inclined cylinder is fitted with a weighted flap valve.

Special means are provided for making connections between tubes and pipes without employing rubber connections, and also for supporting the weight of the teat cup claws, thereby enabling the teat cups to hang more securely on the teats.

The invention will however be more particularly described with the aid of the accompanying drawings, wherein:—

Figure 1 is a sectional elevation of the air compressor, air exhauster and pulsator.

Figure 2 is a sectional elevation of the milk releaser.

Figure 3 is a sectional elevation of a teat cup's claw and means for supporting same.

Figure 4 is an enlarged sectional plan view of a teat cup's claw fitted with means for gripping supporting wires.

Figure 5 is an enlarged sectional elevation of a teat cup and

Figure 6 is a plan view of same.

Figure 7 is a part elevation of a teat cup jaw and

Figure 8 is a sectional plan view of same.

Figure 9 is a vertical section of one of the teat cup plungers.

Figure 10 is a plan view of the jaws of a teat cup removed therefrom while

Figure 11 is a sectional elevation of a connection between a branch and main pipe.

Referring to Figure 1 of the drawings 3 is a cylinder within which is reciprocated by means of a rod 2 actuated from a prime mover a piston 1 said cylinder 3 being closed at both ends 4 and 5.

From at or near its end 5 the cylinder 3 is connected through a pipe 9 with a vacuum tank (not shown) while from its end 4 a pipe 8 also passes to said tank. The pipes 8 and 9 are provided with valves 10 and 11 respectively, whereby air can be exhausted from the tank and parts in communication therewith on the piston 1 moving away from said pipes, and so that pressure will not pass into said pipes 8 and 9 on the reverse strokes of the piston occurring.

At the end 5 of the cylinder 3 is a smaller cylinder 17 in which operates a sleeve valve 18 the stem 19 of which normally projects into the cylinder 3 under the influence of the compression spring 20 located between the closed end 18ª of the sleeve valve 18 and the outer end 17ª of the smaller cylinder 17.

The pipe 21 connects the outer end of the cylinder 17 with the pipe line of the system in which compressed air and vacuum are caused to act alternately.

From the cylinder 17 at a point just beyond the sleeve valve 18 when the latter occupies its normal position of rest, a pipe 22 leads to a compressed air storage chamber or reservoir (not shown), the latter also communicating with the interior of the cylinder 3 through its end 4 by means of a pipe 12, fitted with a valve 13 adapted to open under pressure and close under suction.

A pipe 16 communicating with the interior of the cylinder 3 through the latter's end 5 enters the pipe 22 and is fitted with a valve 15 which opens under pressure and closes under suction.

The cylinder 17 is provided with a port or passage 23 open at both ends to its interior one end of said port 23 opening into the cylinder 17 next the latter's end 17ª while the other end of said port or passage 23 opens into the cylinder 17 through the portion thereof near the end 5 of the cylinder 3.

At the inner or closed end 18ª of the sleeve valve 18 is provided a sleeve valve 24 connected to and kept normally pressed away from said valve 18 by a spring 25, and adapted to seat itself against a fixed ring 26 inside the cylinder 17. A valve 27 surrounding the stem 19 of the sleeve valve 18 and of less diameter than the interior of the cylinder 17 is normally held against the other side of the ring 26 by a spring 27ª.

Ports 14 through the cylinder end 5 provide for communication between the cylinders 3 and 17.

The piston 1 in moving from the end 4 of the cylinder 3 towards the end 5 thereof, creates vacuum in the back end of the cylinder and pressure in the front end.

The vacuum opens the valve 10 and acts in the pipe 8 connected with the vacuum tank thereby exhausting air from the latter and parts in communication therewith, said vacuum at the same time closing the valve 13 in the pipe 12 communicating with the compressed air reservoir.

The pressure created on the other side of the piston 1 closes the valve 11 and opens the valve 15, whereby said pressure is enabled to pass into the pipes 16 and 22 connected with the compressed air reservoir and to pass with pressure from the latter into the cylinder 17 beyond the sleeve valve 18 and ultimately through the pipe 21 to the pulsating line of the system.

At the same time, air pressure passing through the ports 14 forces the valve 27 hard against the ring 26.

Continuing the same stroke the piston 1 strikes the stem 19 of the valve 18 and moves the latter in the cylinder 17 against its spring 20 towards the end 17$^a$ thereof until it closes the end of the pipe 22 opening into said cylinder 17. Shortly following the closing of the pipe 22 by the valve 18 and after the spring 25 has expanded the valve 24 is drawn from opposite the pipe 23$^a$, which is in communication with the vacuum tank, thereby permitting vacuum to act in pipe 21 via pipe 23$^a$ and port 23.

With the air pressure unable to enter the cylinder 17 from the pipe 22 it all passes to the compressed air reservoir via the pipes 16 and 22.

When the sleeve valve 18 is at the limit of its outward stroke, the piston 1 is close to the end 5 of the main cylinder 3, and is past the pipe 9 leading to the vacuum tank.

On the piston 1 commencing its return stroke the sleeve valves 18 and 24 also commence to move in the reverse direction under the expansion of the spring 20.

The return stroke of the piston 1 creates vacuum in the end of the cylinder 3 connected with the cylinder 17 and pressure in the opposite end, said pressure opening the valve 13 and passing via the pipe 12 to the compressed air reservoir and also having the effect of closing the valve 10.

The vacuum created in the end of the cylinder 3 in communication with the cylinder 17 acts through the ports 14 and pulls the valve 27 surrounding the stem 19 away from the ring 26 against the action of its spring 29$^a$ thereby permitting the vacuum to act through the passage of port 23 in conjunction with the vacuum from the pipe 23$^a$ and to act in the outer end of the cylinder 17 so as to exhaust air in the pipe 21 and parts in communication therewith.

During this movement the sleeve valve 18 prevents communication between the cylinder 17 and the compressed air reservoir by covering the end of the pipe 22, opening into said cylinder.

The movement of the sleeve valves 18 and 24 together in the cylinder 17 continues until the valve 24 seats itself against the ring 26 and closes the opening or passage through the same, at the same time as or shortly following the closing of the end of the pipe 23$^a$.

The latter action completely cuts off the vacuum from the port or passage 23. The valve 24 is now stationary while the valve 18 is still moving under the influence of the spring 20 which is stronger than the spring 25.

The valve 18 continues to move away from the end 17$^a$ until it re-opens the pipe 22 to the cylinder 17, whereupon it comes to rest.

The movement of the valve 18 while the valve 24 is at a standstill results in the spring 25 being compressed, such compression being required in order that said spring 25 will cause the valve 24 to keep the end of the pipe 23$^a$ covered until such time as the pipe 22 is cut off from the cylinder 17 by the valve 18, when the latter is being forced by the piston 1 towards the end 17$^a$.

The result of the opening of the pipe 22 by the sleeve valve 18 is that the vacuum acting in the pipe 21 and parts in communication therewith is broken down by pressure being again admitted into the outer end of the cylinder 17 through the pipe 22, such pressure being prevented from passing any where else.

The piston 1 continuing its stroke towards the end 4 of the cylinder 3 passes the pipe 9 immediately following which the valve 11 opens under suction allowing air to be exhausted from the vacuum tank and parts in communication therewith, such action continuing until piston 1 completes its stroke.

The constant vacuum pipe line 45$^a$ Figure 2 is in communication with the vacuum tank from and through which air is exhausted by the movements of the piston 1 within the cylinder 3.

The vacuum and compressed air pressure pipe line 47$^a$ Figure 2 is in communication with the pipe 21 from the end 17$^a$ of the cylinder 17.

The milk releasing means Figure 2 comprises a chamber 41 having a reduced lower end communicating through a port 42 with the larger portion of a two diameter inclined cylinder 28 having at its lower end a flap valve 29 provided with a weight 30 which causes said valve to normally close the lower end of said cylinder 28.

The upper end of the cylinder 28 has screwed thereon a cap 46 formed with a tubular portion 46$^a$ adapted to be inserted in the pipe line 47$^a$ so as to form part thereof, whereby the alternate air pressure and vacuum acting in said pipe line will also act in the upper end of the cylinder 28 and in the connection 48 which is in communication with pulsation spaces of teat cups.

The top 43 of the chamber 41 fits inside the latter and is provided with a tubular portion 43$^a$ which communicates with the interior of the chamber 41 through a port 45, and is inserted in the main milk and vacuum pipe line 45$^a$ in order that the vacuum acting in the latter will also act in the chamber 41, and the connection 44ª in communication with the interior or milk spaces of teat cups. The connection 44ª is formed with a hollow spherical end 44ᵇ which is retained in a concave seating 6 in the top 43 by a spring clip 7 secured to the tubular portion 43ª and shaped to fit over the spherical end 44ᵇ which is open to the connection 44ª and contains a port 6ª registering with a port 7ª through the top 43.

A hollow piston 31 fitted with a flap valve 40 at its open or lower end and containing ports 39 in its closed end works in the larger end of the cylinder 28 and is secured to one end of a rod 32 passing through a stuffing box 38ª in the wall 38 between the smaller and larger diameters of the cylinders, into the smaller portion of the cylinder 28. A plunger 33 is detachably connected to the other end of the rod 32 by a pin 26 which also enters guide slots 26ª in the cylinder 28.

A spring 37 surrounds the rod 32 between the plunger 33 and the wall 38.

In operation the pulsations caused by the alternate action of compressed air and vacuum in the pipe line 47ª are transmitted to the teat cups in communication with the connection 48 and also act in the upper end of the cylinder 28.

The constant vacuum acting in the pipe line 45ª and through the chamber 41 draws milk from the teat cups in communication with the connection 44ª into the chamber 41 said milk falling by gravity in the latter and passing through the ports 39 in the piston 31 to accumulate in the lower end of the cylinder 28 which is closed by the weighted valve 29 assisted by the action of vacuum in said cylinder.

When air pressure from the pipe line 47ª is admitted to the upper end of the cylinder 28 the plunger 33 is forced downwards in the upper or smaller portion thereof against the action of the spring 37. This downward movement of the plunger 33 also forces the piston 31 downwards against the milk accumulated in the lower end of the cylinder 28, whereby the flap valve 40 is closed and the milk compressed until the flap valve 29 is forced open and allows the milk to escape to atmosphere.

When vacuum from the pipe line 47ª acts in the upper end of the cylinder 28 the plunger 33 assisted by the spring 37 moves upwards drawing with it the hollow piston 31. On upward movement of the latter occurring the weighted valve 29 closes by gravity and assisted by the vacuum created by the movement of the piston 31 again seals the lower end of the cylinder 28. Milk has, during the time the flap valve 40 has been closed, been accumulating in the piston 31, and as soon as the valve 29 closes and the pressures on each side of the valve 40 become more or less equal, the weight of milk forces the valve 40 to open and allow the milk to again accumulate in the lower end of the cylinder 28.

The pin 26 is entered in the guide slots 26ª for the purpose of preventing the piston 31 from turning in the cylinder 28 so that the hinge of the valve 40 will be retained uppermost.

The milk on being released from the cylinders 28 passes into a chute 50 which leads it to where required.

The milk releasing means illustrated in Figure 2 can be fitted in each cow bail in order to release the milk from each cow apart from the milk from the other cows, so that the amount of milk taken from each cow and the quality of same can be observed and ascertained. When this is done, the milk released from the cylinder 28 passes into a receptacle 51 fitted in the chute 50, said receptacle being provided with a scale or series of markings 51ª for measuring the milk and also with an outlet controlled by a cock 52 for allowing the milk to pass into the chute 50 when finished with.

On the other hand one releasing apparatus can be employed for the whole plant if desired.

The teat cups are each constructed as shown in Figures 5 to 10.

Each teat cup comprises a casing 70 having a closed convex lower end 100 with a port 103 through same, and an enlarged upper end in which screws a flanged mouthpiece 93 the lower portion 94 of which has an internal diameter equal to the internal diameter of the body of the casing and is adapted to be seated on a seating 95 at the junction of the smaller and enlarged portions of the casing 70.

The mouthpiece 93 is shaped so that when inserted in the enlarged upper end of the casing, an annular space 87 is left between the casing and said mouthpiece, the latter also having an internal horizontal ring 96 with an upturned and tapered inner edge 96ª.

A ring 98 screwing into the mouthpiece 93 is provided for the purpose of pinching and holding a short piece of rubber tubing 97 against the upturned edge 96ª so that said tubing 97 is secured vertically as shown in the drawing. The provision of the rubber tubing 97 in the teat entrance to the cup enables the cup to cling to the teat and to secure a firm hold thereon.

In the casing 70 are provided a number of upright hinged jaws each secured to the upper ring 81 of a spring 82 resting on the bottom 100 of said casing.

Each jaw consists preferably of a light wire frame 80 having attached thereto a sheathing of flexible material 80ª. One of the frames 80 is formed integral with the spring 82, while the other frames are formed separately and secured thereto.

The upper and lower ends and the vertical edges of the flexible material 80ª are bent outwards around the upper and lower ends, and the sides of the frames 80 in order to eliminate sharp or abrupt edges on the inner sides of the jaws presented to the teats.

The jaws are preferably curved in cross section as shown in Figure 8 and in order to stiffen the top portions of said jaws, pieces of stiffening material are secured on the outsides of the latter as shown at 80ᵇ in the drawing.

Instead of reinforcing the flexible material 80ª of the jaws with the stiffening material 80ᵇ, single pieces of material thickened or stiffened at the stop portion so as to be rigid, and thin enough to be flexible or pliable at the lower portion can be secured to the frames, 80.

The jaws are formed and fitted to the upper ring 81 of the spring 82 so as to naturally tend to open or press outwards against the casing 70.

A hollow plunger 85 in each cylinder 84 is flexibly connected to a jaw preferably by having at its lower tapered end a projection 91 with a knob 92 on the end, the neck of said projection being entered in a downturned claw 86 on the outside of the lower end of the stiffening piece 80ᵇ or the stiffened portion of the jaw.

A nipple 88 opening into the annular chamber 87 is adapted to be put in communication with the pulsation line 47 of the system through the connection 48.

A hollow sphere 101 on the end of a connection 102 in communication with the milk chamber of a claw 61 has a port 104 which registers with the port 103 in the lower end 100 of the teat cup casing 70 and is retained in said end 100 by a spring clip 105 secured to said casing.

The connection 44ª Figure 2 is in communication with the pipe 62 Figure 3 which in turn is open to the milk chamber of the claw 61. The connection between the claw 61 and pipe 62 is made by means of a hollow sphere 65 on the latter, containing a port 63 which registers with a port 64 opening into the milk chamber of the claw 61. The sphere 65 is retained or held in a spring clip 66 attached to the claw.

The operation of the teat cup is as follows.

When the air pressure is transmitted through the nipple 88 and annular space 87 and ports 89 to the cylinders 84, the plungers 85 in the latter are forced downwards and press the flexible jaw inwards and downwards against the teat, thereby obtaining a squeeze similar to that given by the human hand in milking. This action combined with the effect of vacuum acting constantly in the interior of the cup through the lower connection 102 results in the milk being induced from the teat and to pass into the connection or pipe 102 from which it ultimately finds its way to releasing apparatus.

When the supply of compressed air is cut off from the cylinders 84 and vacuum caused to act therein, the plungers 85 move upwards and the jaws assisted by the spring 82 move upwards and open outwards.

The flexible jaws are stiffened at their upper portions so that when forced inwards by the plungers 85, said stiffened portions grip or obtain a firm hold around the upper portion or root of the teat before the lower flexible portions commence to squeeze or grip the lower portion thereof.

By regulating the gripping of the teat by the jaws as described and at the same time causing the latter to give a downwardly moving or sliding grip or squeeze, the milk is induced to flow much more freely from the teat than where a more or less uniform or even horizontal squeeze is given, thereby enabling cows to be completely milked and avoiding hand stripping.

Provision is made for supporting or taking the weight of the claws 61 by providing the latter with lugs 74 (Figures 3 and 4) each of which contains an opening 76 into which a suspending wire or the like 72 is pinched by thumbscrews 75 working through said lugs.

The wires or the like 72 contain tension springs 77 for the purpose of making the wires elastic. The means for connecting a branch line 53 with a main or other line 54 (see Figure 11) comprise hollow spheres 55 and 57 the former being secured in and having communication with the line 54 through directly opposite ports 56, while the latter sphere is attached to the end of the line 53 and is in communication with the latter through a port 59.

The sphere 57 has also a second port 58 directly opposite the port 59, while the sphere 55 has its lower portion cut away in order that the portion of the sphere 57 containing the port 58 may be entered therein and so establish communication between the two spheres.

The two spheres 55 and 57 are retained in engagement with each other by a spring clip 60 preferably attached to the sphere 55 and shaped to embrace and hold the sphere 57 or vice versa.

What I do claim and desire to obtain by Letters Patent of the United States of America is:—

1. A milking machine comprising air compressing and exhausting means; teat cups containing jaws acting direct on the teats and operated by compressed air and vacuum; vacuum connections to the lower ends of said teat cups; and means for releasing milk from the vacuum of the plant, substantially as described and illustrated.

2. A milking machine comprising air compressing and exhausting means; teat cups containing jaws adapted to be forced inwards and downwards by the action of compressed air and to be returned outwards and upwards under the influence of vacuum; vacuum connections to the lower ends of said teat cups and means for releasing milk from the vacuum of the plant substantially as described and illustrated.

3. A milking machine comprising air compressing and exhausting means; teat cups containing flexible jaws adapted to be forced inwards and downwards by compressed air to squeeze the teats and adapted to be returned outwards and upwards under the influence of vaccum and a spring; vacuum connections to the lower ends of said teat cups; and means for releasing the milk from the vacuum of the plant, substantially as described and illustrated.

4. A milking machine comprising air compressing and exhausting means; teat cups containing flexible jaws hinged at the lower ends, adapted to be forced inwards and downwards by the action of compressed air to squeeze the teats and adapted to be returned outwards and upwards under the action of vacuum and a spring; vacuum connections to the lower ends of the teat cups; and milk releasing means actuated by compressed air and vacuum substantially as described and illustrated.

5. In a milking machine a teat cup containing jaws free at the upper ends acting directly on the teats and adapted to be forced inwards by the action of compressed air and to be returned outwards under the influence of vacuum substantially as described and illustrated.

6. In a milking machine a teat cup containing hinged jaws free at the upper ends resting on a spring in the cup casing and adapted to be forced inwards and downwards by the action of compressed air and to be returned upwards and outwards under the influence of vacuum substantially as described and illustrated.

7. In a milking machine a teat cup containing jaws of flexible material hinged at the lower ends and resting on a spring in the bottom of the cup casing and adapted to be forced inwards and downwards by compressed air acting on plungers flexibly connected to said jaws; said jaws being returned outwards and upwards by the action of vacuum on said plungers substantially as described and illustrated.

8. In a milking machine a teat cup containing jaws of flexible material stiffened at their upper portions and hinged at their lower ends on a supporting spring in the bottom of the casing; and plungers flexibly connected to the lower ends of said reinforced portions, operating in downwardly inclined cylinders on said casing, under the alternate actions of compressed air and vacuum substantially as described and illustrated.

9. In a milking machine, a teat cup comprising a casing containing a horizontal annular air space in its upper portion; inclined cylinders open to said space at or near their upper ends and open to the interior of the casing at their lower ends; plungers in said cylinders connected at their lower ends to jaws free at their upper ends and hinged at their lower ends in said casing and adapted to operate under the alternate actions of compressed air and vacuum; and vacuum connections to the lower ends of said casings, substantially as described and illustrated.

10. In a milking machine teat cup, comprising a casing having an enlarged upper end; a mouthpiece screwing into said enlarged upper end so as to provide a horizontal annular space in the upper portion of the cup; an internal ring with an up turned and tapered inner edge on said mouthpiece; a ring screwing into said mouthpiece; a piece of rubber tubing gripped between said ring and the upturned edge; cylinders on said casing open to the latter and the annular space; plungers connected to movable jaws in the casing; a vacuum connection to the lower end of the cup and means for causing compressed air and vacuum to act alternately in said cylinders through said annular space, substantially as described and illustrated.

11. In a milking machine an air compressor and exhauster a cylinder in communication therewith adapted to be put in communication with the pulsating line of the machine, a compression and vacuum operated teat cup connected to the pulsating line, a port leading from one end of said cylinder to near the other end thereof; vacuum and compressed air connections to said cylinder and valves operating in the latter to open and close said connections, substantially as described and illustrated.

12. In a milking machine; an air compressor and exhauster a cylinder in communication therewith at one end, and open at the other end to the pulsating line of the machine; a compression and vacuum operated teat cup connected to the pulsating line, a port leading from one end of said cylinder to near the other end thereof; vacuum and compressed air connections to said cylinder; a sleeve valve operated in one direction by the piston of the air compressor and exhauster, and in the other direction by a spring for controlling the admission of compressed air to said cylinder; and valves in said cylinder for regulating the action of vacuum therein substantially as described and illustrated.

13. In a milking machine; an air compressor and exhauster connected with a vacuum tank and a compressed air reservoir; a cylinder in communication with said compressor and exhauster at one end and open at the other end to the pulsating line of the machine; a variable pressure operated teat cup connected to the pulsating line, a port leading from one end of said cylinder to near the other end thereof; connections for compressed air and vacuum between the reservoir and vacuum tank and said cylinder; a sleeve valve operated by the piston of the compressor and exhauster against the action of a spring for controlling the admission of compressed air to said cylinder; a further sleeve valve connected to and operated by the first mentioned sleeve valve for controlling the action of vacuum in said cylinder from the vacuum tank and a spring pressed valve operating in the end of said cylinder adjacent the compressor and exhauster for the purpose set forth, substantially as described and illustrated.

In testimony whereof I have signed my name to this specification in the presence of two witnesses.

THOMAS CUMMINGS.

Witnesses:
ERNEST WILFRED BOYCE CAREY,
PERCIVAL STAFFORD BYRNE.